June 6, 1950        B. H. FORSSMARK        2,510,744
WELD WHEEL CONSTRUCTION
Filed Aug. 9, 1947        2 Sheets-Sheet 1
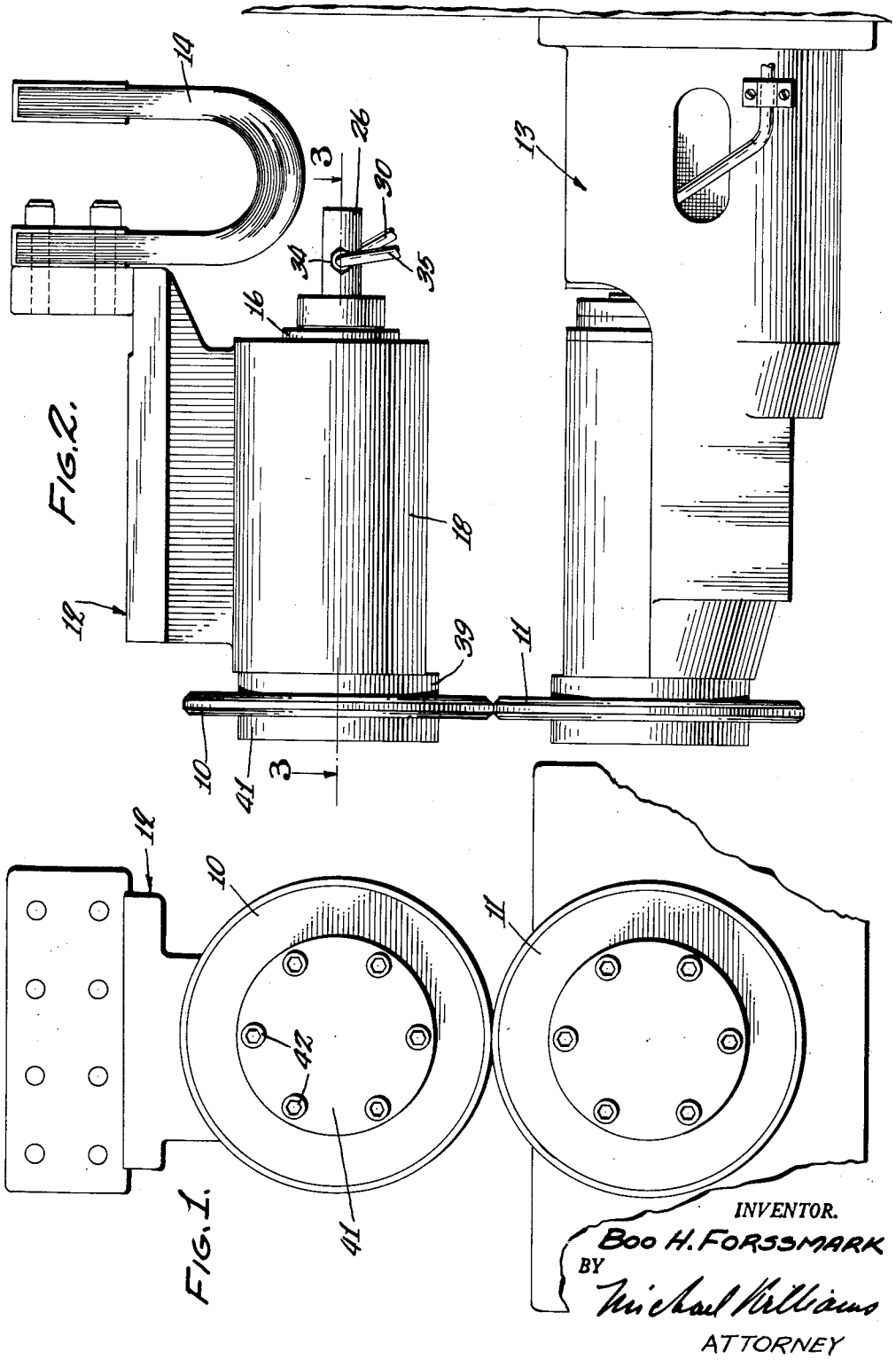
INVENTOR.
Boo H. Forssmark
BY
Michael Williams
ATTORNEY

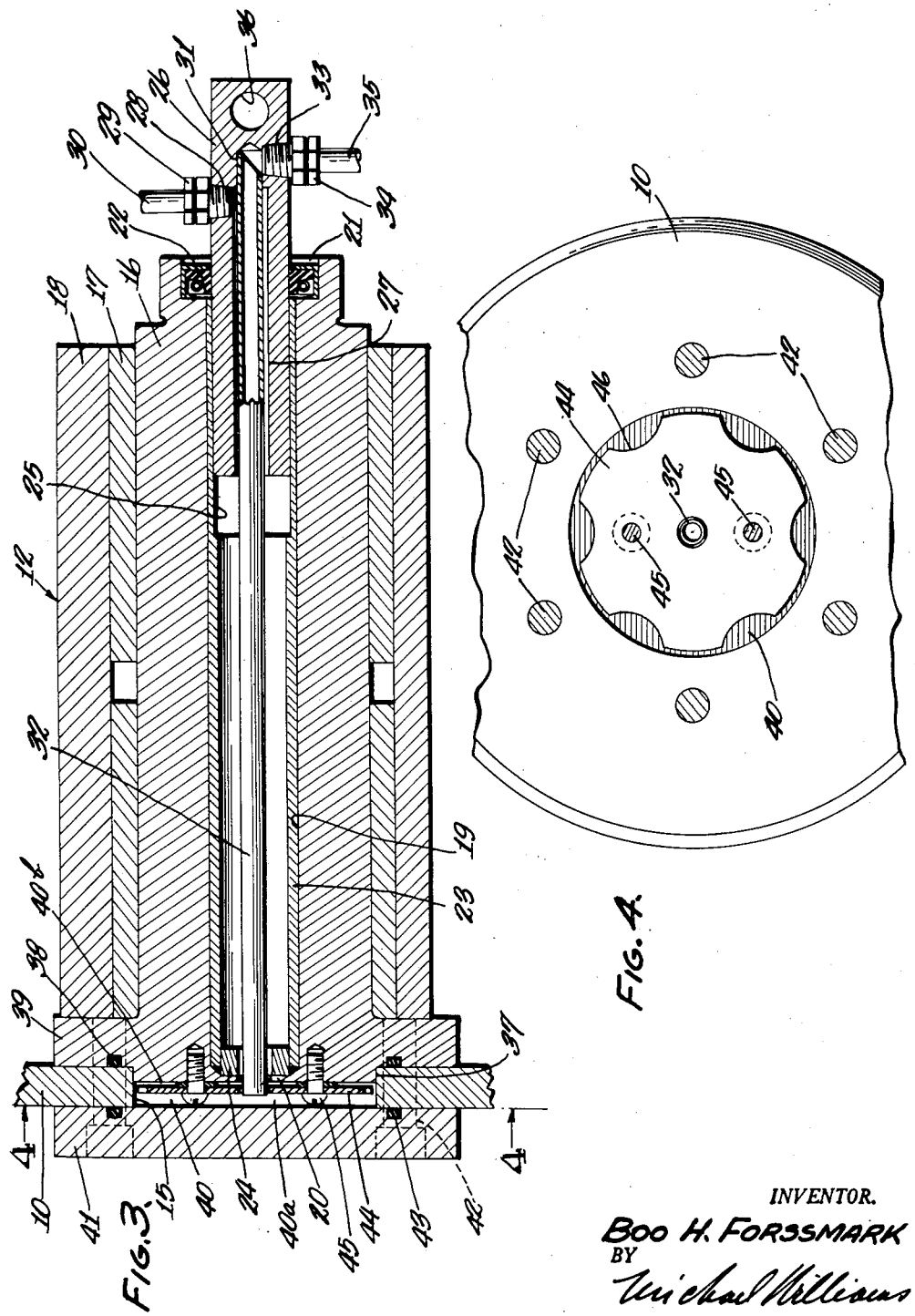

Patented June 6, 1950

2,510,744

UNITED STATES PATENT OFFICE 2,510,744

WELD WHEEL CONSTRUCTION

Boo H. Forssmark, Warren, Ohio, assignor to Federal Machine and Welder Company, Warren, Ohio, a corporation of Ohio Application August 9, 1947, Serial No. 767,679

4 Claims. (Cl. 219—4)

My invention relates to weld wheel construction, particularly to such construction wherein provision is made for cooling the weld wheel, and the principal object of my invention is to provide new and improved constructions of this general character.

In resistance welding, considerable heat is generated at the electrodes, and failure to dissipate such heat causes many disadvantages such, for example, as fluctuation of the welding current resulting in improper welds, softening of the electrodes resulting in mushrooming and excessive wear, difficulties in bearing clearances, to name a few.

In some cases, the welding electrodes were operated under cooling water, and in other cases, the electrodes were cored or machined to provide passages for the cooling medium. In all of the prior art, the results were far from satisfactory, either because of difficult handling problems or costly manufacture and maintenance reasons. My invention provides a wheel electrode construction that is not only economical of manufacture and requires little maintenance, but also is highly efficient from cooling and operating standpoints.

In the drawings accompanying this application, and forming a part of this specification, there is shown, for purposes of illustration, an embodiment which my invention may assume, and in these drawings:

Figure 1 is a fragmentary end elevational view of a seam welder which may be used to practice my invention, Figure 2 is a fragmentary side elevational view of the welder shown in Figure 1, Figure 3 is an enlarged fragmentary sectional view corresponding generally to the line 3—3 of Figure 2, and Figure 4 is a transverse fragmentary sectional view corresponding generally to the line 4—4 of Figure 3.

Referring particularly to Figures 1 and 2, the embodiment chosen to illustrate the invention comprises electrode wheels 10 and 11 respectively carried by a head 12 and a horn 13. In this case the head 12 is movable toward and away from the horn 13 by any suitable power mechanism (not shown), a flexible lead 14 providing for electrical connection to one side of the secondary of the usual welding transformer. The other side of the transformer is connected to the lower electrode 11, the circuit usually including the lower horn 13 which is therefore made of good current conducting material.

The weld wheel 10 is provided with a recessed or chambered portion through which a cooling fluid may be circulated. As best seen in Figures 3 and 4, the weld wheel 10 is generally disc-like and is formed with a central annular aperture 15.

The weld wheel 10 is carried by a shaft 16 which is journalled in bearings 17 carried by a housing 18 which forms part of the head 12. The shaft 16 is hollow, having a bore 19 extending substantially entirely therethrough, the bore terminating at one end of the shaft in a restricted portion forming a shoulder 20 and terminating at the other end of the shaft in an enlargement 21 for the reception of a fluid seal 22, the purpose of which will be apparent later.

A bearing sleeve 23 is secured within the bore 19, and a spacer collar 24 is secured within the sleeve in position adjoining the shoulder 20.

The sleeve 23 has an enlarged diameter 25, and closely fitting within this enlarged portion is a stub shaft 26 which is drilled from one end to provide a longitudinal passage 27 which communicates with a transverse opening 28, the latter threadedly engaging a plug 29 connected to a conduit 30.

The passage 27 is reduced in size beyond the opening 28, as shown at 31, to closely receive one end of a tubing 32, the extremity of the tubing being cut on an angle to the tubing axis, and the angled extremity being directed toward a transverse opening 33 which threadedly receives a plug 34 connected to a conduit 35.

From the forgeoing description, it will be evident that the conduit 30 has communication with the interior of the sleeve 23, and broadly with the interior of the hollow shaft, whereas the conduit 35 communicates with the interior of the tubing 32. Since the sleeve 23 in this case rotates with the shaft 16, the stub shaft 26 has a rotatable bearing fit with the enlarged portion 25 of the sleeve, and the stub shaft remains stationary.

In some cases merely the conduit connections 30, 35 are sufficient to maintain the stub shaft stationary. However, to relieve such conduits from strain, the stub shaft may be provided with a transverse opening 36 for the reception of a suitable anchoring device (not shown). The fluid seal 21, which may be of any conventional type, prevents leakage of fluid between the relatively rotating parts.

The shaft 16, adjoining the weld wheel is formed with an annular shoulder 37 which closely fits within the annular aperture, except for communication with the interior of the sleeve 23 through the space between the collar 24 and the tubing 32. A packing 38 is provided to prevent leakage of fluid between a head 39 formed on the shaft 16 and the wheel electrode 10.

Means are provided for securing the wheel electrode 10 to the shaft 16 and for rotation therewith, such means closing the recess formed by the shoulder 37 and the annular aperature 15, to thus form a chamber 40 through which fluid may be circulated. In this particular embodiment, such means comprises a disc 41, and a plurality of bolts 42 which pass through apertures in the disc 41, the weld wheel 10, and are threaded in apertures in the head 39. A packing 43 is interposed between the disc 41 and the wheel electrode 10 to prevent leakage of fluid therebetween. As clearly seen in Figure 3, the disc 41 spans the open end of the aperture 15, and forms the chamber 40.

Baffle means are provided within the chamber 40, for directing flow of fluid, and in this embodiment, the baffle means comprises a relatively thin disc 44 secured to the shaft 16 by means of machine screws 45, and in spaced relation with respect to the shoulder 37, as by means of washers, so as to divide the chamber 40 axially into two sections. The baffle disc 44 has a central opening for closely passing the adjacent extremity of the tubing 32, such extremity therefore communicating with the section 40a of the chamber 40, while the interior of the hollow shaft communicates with the section 40b of the chamber 40. The baffle disc 44 may have a scalloped marginal edge, as shown at 46.

In view of the preceding description, it will be clear that a cooling fluid may be introduced through either one of the conduits 30, 35, the circuit including the interior of the shaft 16, the sections 40a, 40b of the chamber 40, the interior of the tubing 32, and the conduit 30, or 35, whichever is connected to exhaust. Thus, an efficient cooling system is provided which is economical of manufacture and maintenance.

The cooling construction for the weld wheel 11, in this particular instance, is identical to that already described, and further description is believed unnecessary.

From the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A weld wheel construction comprising: a weld wheel having a central opening extending therethrough; a shaft for said weld wheel, having a portion closing one side of said opening; and means securing said weld wheel to said shaft, having a portion closing the other side of said opening and forming a chamber including the opening in said weld wheel for receiving a cooling fluid.

2. A weld wheel construction, comprising: a relatively flat weld wheel having a central opening extending therethrough; a hollow shaft for said weld wheel having a portion abutting one side of said weld wheel, said portion having a shoulder extending into said weld wheel opening but of an axial length to only partially fill said opening, said shoulder closing the adjacent side of said opening except for communication with the interior of said shaft and assisting in centering said weld wheel; and means abutting the opposite side of said weld wheel and spanning said opening adjacent said opposite side, whereby a cooling chamber is formed including part of said opening through said weld wheel.

3. A weld wheel construction, comprising: a relatively flat wheel having a central annular opening extending therethrough; a hollow shaft, having an enlargement abutting one side of said weld wheel, said enlargement having an annular undercut portion closely fitting within said weld wheel opening but being of less axial length than the axial length of said opening so as to only partially fill said opening, said undercut portion closing the adjacent side of said opening except for communication with the interior of said shaft and assisting in centering said weld wheel; disc means abutting the opposite side of said weld wheel and spanning said opening adjacent said opposite side, whereby a cooling chamber is formed including part of said opening through said weld wheel; and screw means, engaging said disc means, said weld wheel and said enlargement, for holding these parts in assembled relation.

4. A weld wheel construction, comprising: a relatively flat wheel having a central annular opening extending therethrough; a hollow shaft, having an enlargement abutting one side of said weld wheel, said enlargement having an annular undercut portion closely fitting within said weld wheel opening but being of less axial length than the axial length of said opening so as to only partially fill said opening, said undercut portion closing the adjacent side of said opening except for communication with the interior of said shaft and assisting in centering said weld wheel; a tube within said shaft, in spaced relation with the inner surface of said shaft; disc means abutting the opposite side of said weld wheel and spanning said opening adjacent said opposite end, whereby a cooling chamber is formed including part of said opening through said weld wheel; a flat disc-like baffle member carried by said shaft in spaced relation with respect to the terminal surface of said undercut portion and the interior surface of said disc means, said baffle member dividing said chamber into two portions, one communicating with the interior of said shaft and the other communicating with said tube, the peripheral surface of said baffle member providing for fluid communication between said chamber portions at the defining surface of said weld wheel opening.

BOO H. FORSSMARK.

REFERENCES CITED

The following references are of record in the file of this patent:

UNITED STATES PATENTS

| Number | Name | Date |
| --- | --- | --- |
| 1,778,628 | Eckman | Oct. 14, 1930 |
| 2,136,059 | Sciaky | Nov. 8, 1938 |
| 2,254,657 | Kennon | Sept. 2, 1941 |

FOREIGN PATENTS

| Number | Country | Date |
| --- | --- | --- |
| 208,331 | Great Britain | Dec. 20, 1923 |